J. A. V. TURCK.
CALCULATING MACHINE.
APPLICATION FILED DEC. 1, 1919.
1,357,748.
Patented Nov. 2, 1920.
7 SHEETS—SHEET 1.
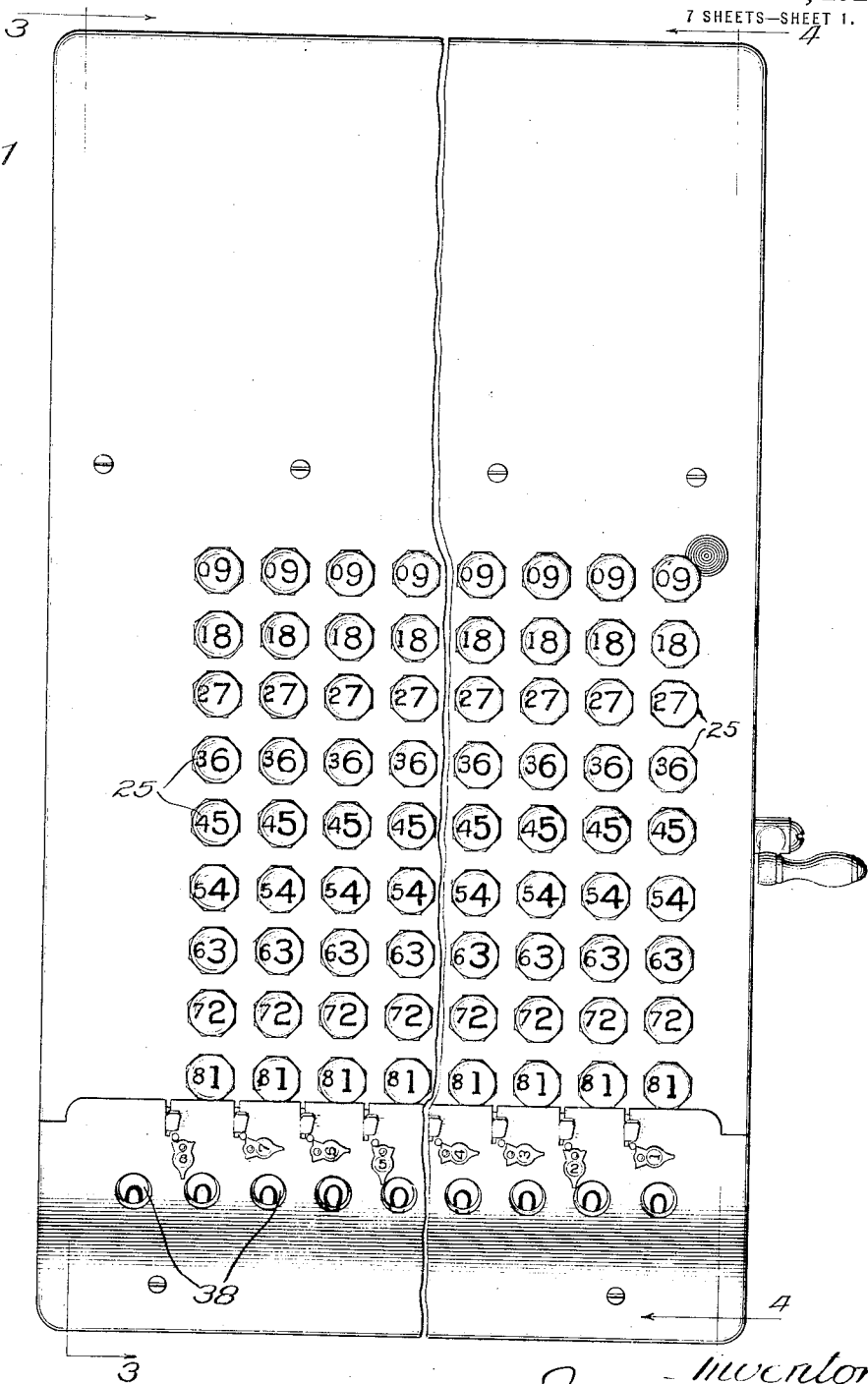

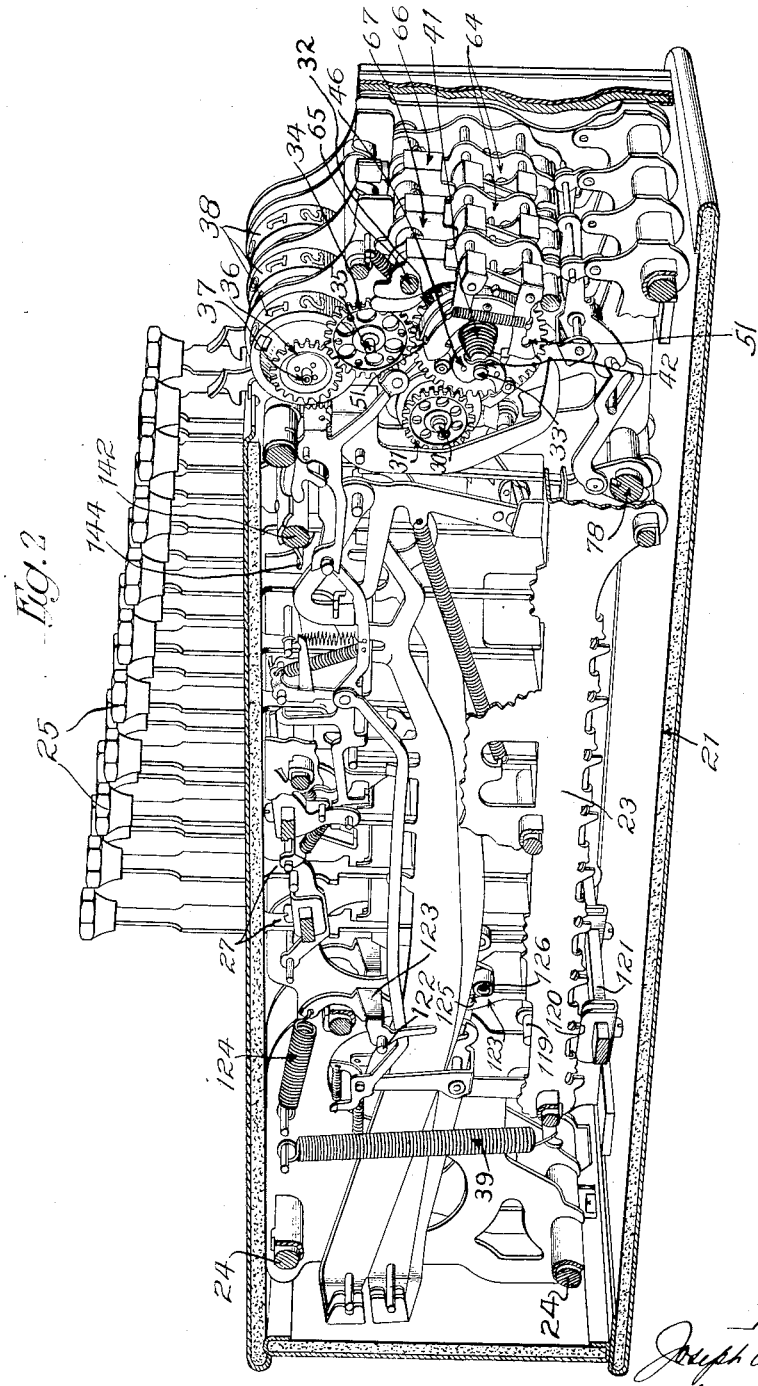

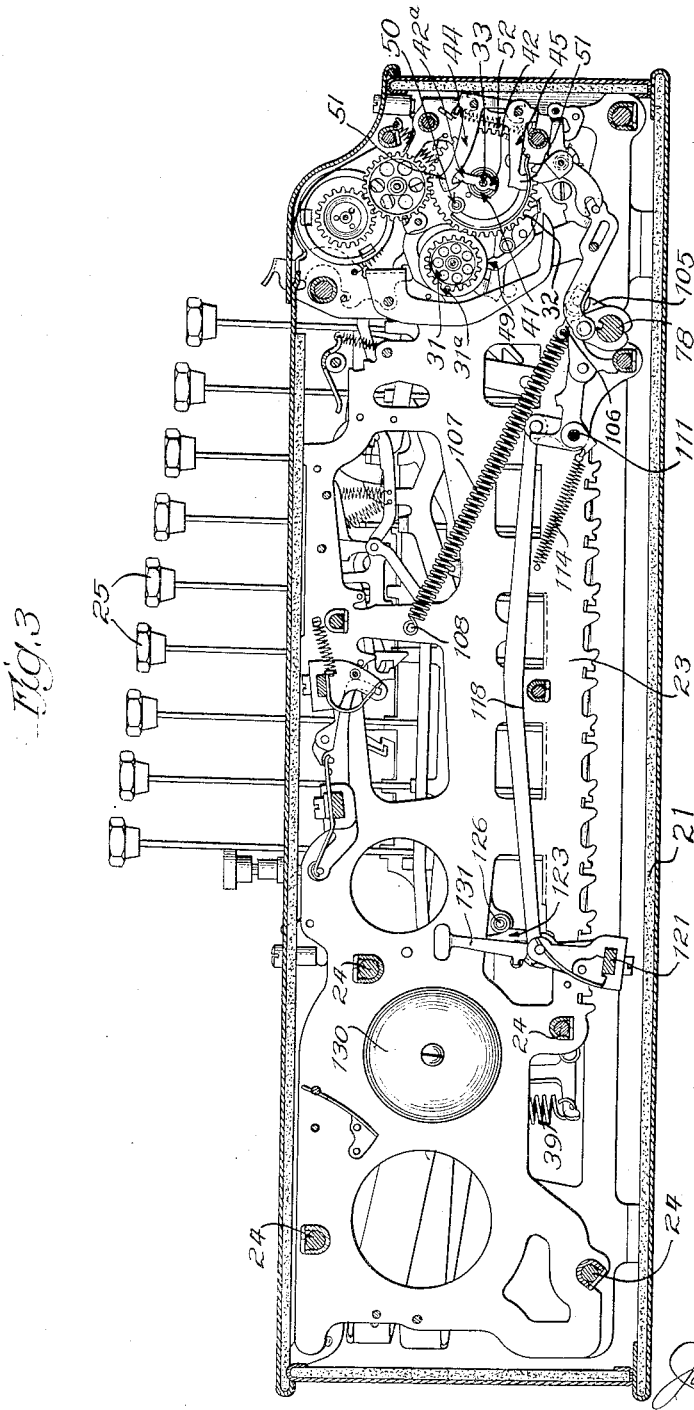

J. A. V. TURCK.
CALCULATING MACHINE.
APPLICATION FILED DEC. 1, 1919.
1,357,748.
Patented Nov. 2, 1920.
7 SHEETS—SHEET 4.
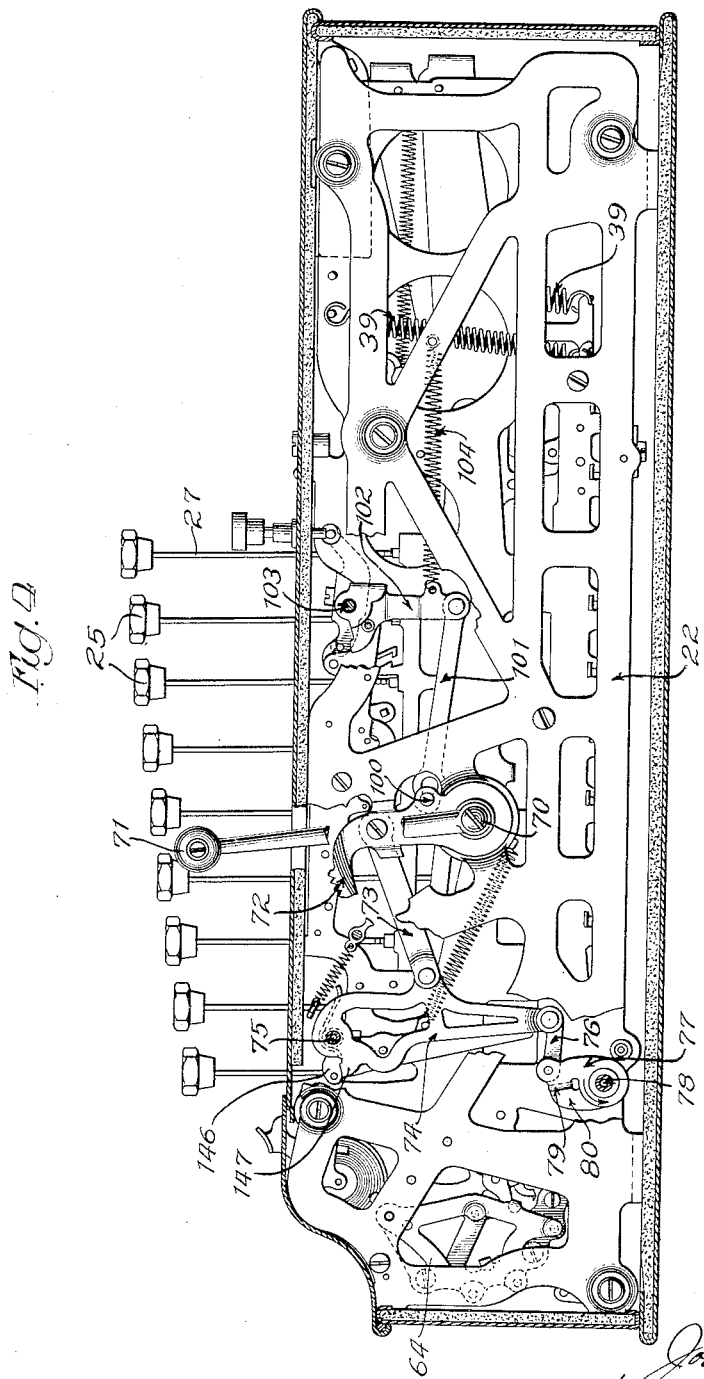

J. A. V. TURCK.
CALCULATING MACHINE.
APPLICATION FILED DEC. 1, 1919.

1,357,748.

Patented Nov. 2, 1920.
7 SHEETS—SHEET 5.

Inventor:
Joseph A. V. Turck,
By Munday, Clarke & Carpenter
his Attys

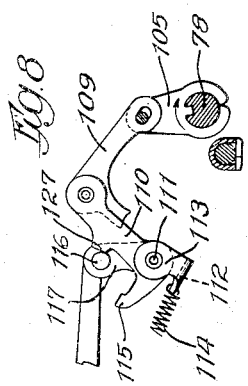
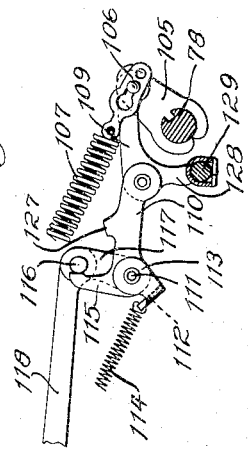
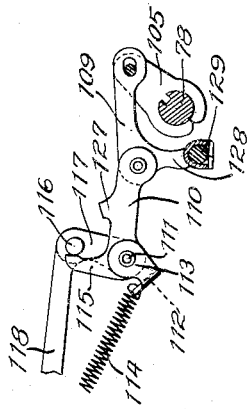
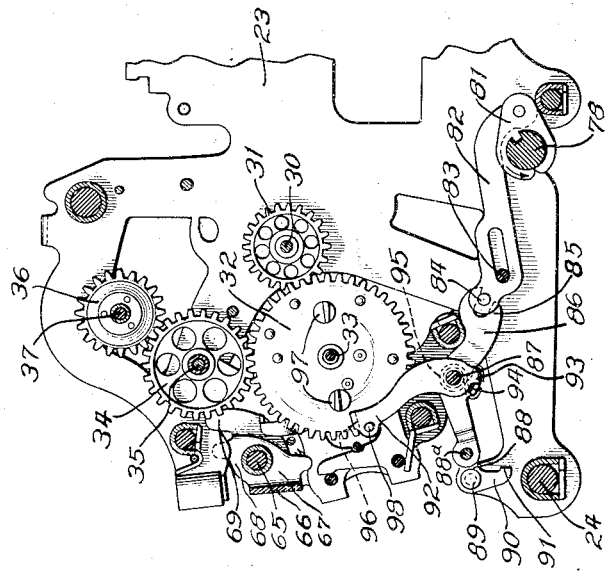

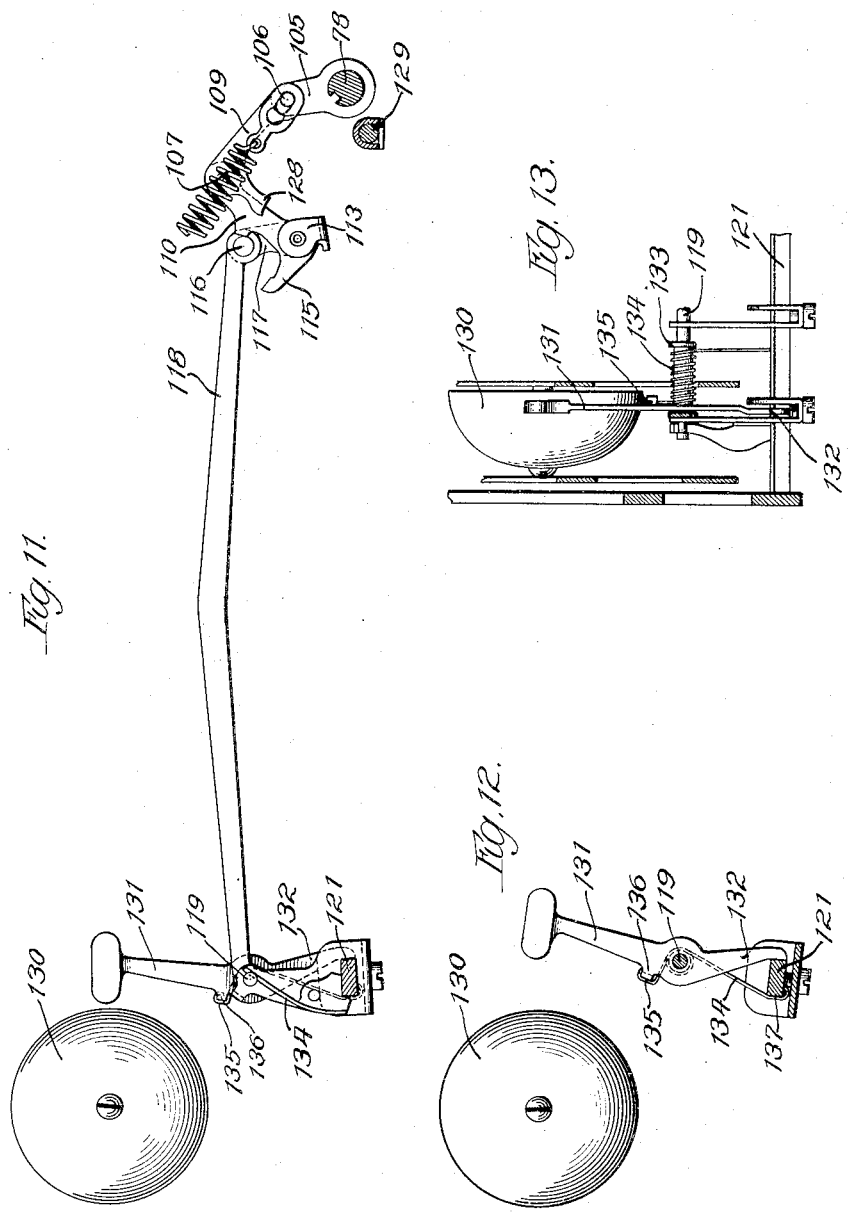

UNITED STATES PATENT OFFICE.

JOSEPH A. V. TURCK, OF WILMETTE, ILLINOIS, ASSIGNOR TO FELT & TARRANT MANUFACTURING COMPANY, OF CHICAGO, ILLINOIS, A CORPORATION OF ILLINOIS.

CALCULATING-MACHINE.

1,357,748.      Specification of Letters Patent.      Patented Nov. 2, 1920.

Application filed December 1, 1919. Serial No. 341,645.

*To all whom it may concern:*

Be it known that I, JOSEPH A. V. TURCK, a citizen of the United States, residing in Wilmette, in the county of Cook and State of Illinois, have invented a new and useful Improvement in Calculating-Machines, of which the following is a specification.

This invention relates to calculating machines and has for its primary object the provision of an improved zeroizing or canceling mechanism that, although positive in action, is extremely light in operation and may be manipulated with a minimum of effort on the part of the operator. The invention is particularly applicable for use in connection with calculating machines of the key-driven multiple order type, although not necessarily restricted thereto and, in the present embodiment is illustrated in a machine of the general type of the well known "Duplex Comptometer" the general character of which is exemplified in the United States patents to Dorr E. Felt Numbers 762,520 and 762,521 dated June 29, 1904, 960,528 dated June 7, 1910, 996,009 dated June 20, 1911, 1,003,723 dated September 19 1911, and the patent to Kurt F. Ziehm 1,110,734 dated September 15, 1914. Specifically, the present invention is an improvement on the zeroizing mechanism shown and described in my co-pending application Serial No. 231,814 filed May 1, 1918.

The invention has for other objects the still further reduction of resistances and lightening of the action of the zeroizing mechanism, with a resultant increase in efficiency of operation; the provision of an exceedingly well balanced zeroizing mechanism that may be operated with an extremely light touch by the swinging of the operating handle through a very short arc; so that the little finger of the operator's hand may be employed to manipulate the zeroizing handle; and the provisions of means for sounding an audible signal upon the next depression of a key after a zeroizing operation has been effected.

The invention has for further objects such other improvements in construction and advantages in operation as may be found to obtain in the mechanism hereinafter described or claimed.

In the accompanying drawings, forming a part of the specification, and showing for purposes of exemplification, a preferred form and manner in which the invention may be embodied and practised, but without limiting the claimed invention specifically to such illustrative instance or instances:—

Figure 1 is a plan view of a calculating machine of the multiple order key-driven type in which the present improvements are embodied;

Fig. 2 is a perspective of the same with portions of the outer casing walls removed to show the interior construction;

Fig. 3 is a front and rear vertical sectional elevation taken at the left hand side of the machine in a plane indicated by the line 3—3 of Fig. 1;

Fig. 4 is a front and rear vertical sectional elevation taken along the right hand side of the machine substantially in a plane indicated by the line 4—4 of Fig. 1;

Fig. 7 is a view of the parts illustrated in Figs. 5 and 6 but viewed from the opposite side of the machine;

Figs. 8, 9 and 10 are detail views of the connections for detaining and restoring swinging-frame parts of the zeroizing mechanism; and, Figs. 11 to 13 inclusive are detail views of the bell signaling mechanism.

Like characters of reference indicate like parts throughout the several views.

Figure 6:
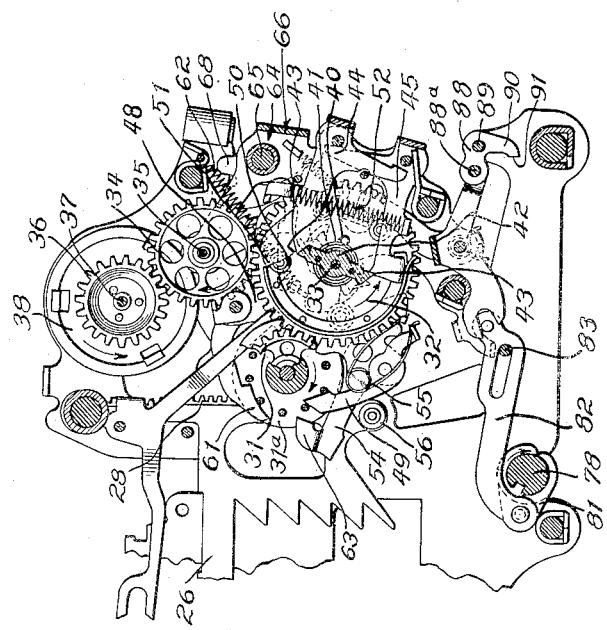
Fig. 6 is a view similar to Fig. 5 but taken in a place to the side of that of Fig. 5.

In its present embodiment, the invention is incorporated in a calculating machine of the multiple order key-driven type, such as the well known Comptometer disclosed in prior United States Letters Patents hereinbefore referred to. As the details of construction of this type of machine may be readily understood from these U. S. patents, a brief description of the general features of this type of machine, and such parts as are directly concerned with the operation of the present improvements, will be sufficient for an understanding of this invention.

The various instrumentalities of the calculating machine are supported by a frame mounted on the base 21 of a casing, said frame consisting essentially of side skeleton plates 22 and intermediate skeleton plates 23 disposed between the various actuating mechanisms of the several orders of the machine and all tied together at suitable points by transverse tie rods 24. A number of columns of nine keys each are provided, each key being indicated by the reference numeral 25, there being a column of nine keys for each numeral wheel that is a duplicate of the other columns, together with the actuating mechanisms and attendant parts interposed between a column of keys and its corresponding numeral wheel. Each column of keys 25 forms a part of an accumulator mechanism for transmitting to its numeral wheel an amount of travel proportionate with the particular key operated, and the accumulator mechanism for each column of keys and its corresponding numeral wheel includes a column actuator in the form of a segment lever 26 pivoted at the rear end of the machine and adapted to be depressed an amount determined by the particular key 25 actuated by the operator. Each key is provided with a stem 27 extending down and bearing upon the column actuators 26, and the key at the extreme front of the machine, being farther from the pivotal axis of the column actuator than the key at the extreme rear of the machine moves the column actuator through a lesser arc than does the key last mentioned. It will be understood that the keys of each column are numbered from "1" to "9" in front to rear order of the machine and that the key at the extreme front is adapted to effect operation of the column actuator through an arc substantially one-ninth of that produced by the operation of the key at the extreme rear of the machine and that upon depression of an intermediate key the column actuator is moved through arcs proportionate with the value of the intermediate key actuated.

The column actuator 26 of each order or column of nine keys of the machine is adapted to impart calculating movement to an accumulator and for this purpose is provided at its forward end with a rack 28 which meshes with an accumulator pinion 29, journaled upon a transverse shaft 30 that extends across the machine and is supported in suitable bearings in the skeleton frame. The pinion 29 of each order forms a part of an internal ratchet mechanism, not herein illustrated but disclosed in the prior patents herein above mentioned and which becomes effective on the upstroke of the column actuator to clutch the pinion 29 to a lantern wheel 31ª and a transmitting pinion or gear 31 that rotates with the lantern wheel and is adapted to mesh with a pinion or gear 32 journaled on a shaft 33 parallel with the aforesaid shaft 30. The gear 32 meshes with an intermediate gear 34 on a transverse shaft 35 and the latter in turn meshes with the numeral wheel pinion 36 journaled on a transverse shaft 37 and fixed to the numeral wheel 38. It will be understood that each time the column actuator is depressed the ratchet mechanism moves idly and hence no motion is transmitted to the gear train beginning with the transmitting pinion 31 and ending with the numeral wheel pinion 36; however, upon the return or upward movement of the column actuator the transmitting pinion 31 is clutched to the accumulator pinion 29 and the gear train rotates the numeral wheel 38 through the arc determined by the particular key actuated. The column actuator is moved upward, upon the removal of the finger of the operator from the key, by the column actuator springs 39.

Carrying mechanism is provided in each accumulator mechanism for the purpose of actuating the accumulator of the next higher order of the machine each time a carry is to go over from a lower order. The ratio of the gears and various parts is such that a complete rotation of the numeral wheel 38 is accompanied by a half rotation of the gear 32, so that at each half rotation of the gear 32 it is essential that a carry go over to the next higher order. In addition to its function as a member of the gear train for transmitting the motion of the column actuator to the numeral wheel, the gear 32 is a carrying motor winding gear and is provided with a stud 40 to which is secured one end of the carrying motor spring 41. The other end of this motor spring is secured to and constantly tends to impart forward rotation to the carrying-escapement member 42 having a stop 42ª (see Fig. 3) of well-known construction, which is adapted to be engaged by first one and then the other of the pair of releasing-detents 44 and 45, so that when said stop is released by one of the detents, the escapement member can make only one-half of a dull rotation before being checked by the engagement of the said stop with the other of the detents; each such half rotation of the escapement member gives a corresponding half rotation to the carrying-cam member that is secured upon the left-hand end of the escapement member. The carrying-cam member 46 consists essentially of a pair of oppositely disposed cam arms against which the dolly roll 47 of the bell-crank carrying-lever 48 rides during the carrying throws imparted to such lever by such cams. Each such 180° throw of one of these carrying-cams lifts the bell-crank carrying-lever sufficiently to cause the carrying-pawl 49 pivotally mounted at the rear end of said lever, to throw the lantern-wheel ratchet of the next higher or left hand accumulator one numeral space, which movement of the lantern-wheel is transmitted through the hereinbefore mentioned train of gears ending with the numeral wheel pinion 36, to effect a carrying transfer from the accumulator mechanism of the lower order to the accumulator mechanism of the next higher order. The release of the escapement member from first one and then the other of its releasing detents 44—45 is effected through the lifting of such detents by a dolly-roll 50 that is mounted on the far side of the carrying-motor winding-gear 32 and adapted to ride under the cam-faced ear 51, projecting laterally from each detent, when the winding gear rotates into proper angular relation with the detent to be released. In this manner it is provided that while the winding gear 32 may, by a full rotation wind into the carrying motor spring 41 sufficient power to effect two carrying throws of the carrying-cam member, the alternate engagement and releasing of the escapement member by first one and then the other of the pair of opposed releasing detents 44, 45 whose connecting spring 52 constantly tends to draw one or the other of them into the path of the stop 42ª of said escapement member, restricts each throw of such escapement member to a half rotation of the winding gear 32, thereby releasing only one carrying-impulse at a time.

In order to prevent either carrying-cam of any carrying-cam member from effecting a carrying throw of the coöperating carrying lever at a time when the accumulator of the higher order impelled by said carrying lever is already in motion or is about to be moved by the column actuator that has been or is being depressed by one of the keys in that higher order, there is provided a detaining latch tooth 53 formed, in accordance with the present invention, on the front end of a stop detent 54, in said higher order, which stop detent 54 is pivotally mounted on the carrying bell crank lever 48 and is adapted to be actuated by a spring 55 to shift such detaining latch tooth into restraining engagement with either one or the other of the stops 43 carried by the escapement member. Normally the detaining latch tooth 53 is held out of engagement with a stop 43 of the escapement member by the dolly-roll 56 on the column actuator of said next higher order; on depression of such column actuator, however, the dolly-roll moves out of engagement with the stop detent 54, thereby permitting the spring 55 to shift said stop-detent 54 into such position that the detaining latch tooth 53 is in engagement with a stop 43 of the escapement member, and this relation of the parts is maintained until the column actuator regains its normal elevated position. The carrying-escapement member 42 is caught by the detaining latch 53 just after it has escaped one or the other of said escapement detents 44, 45, just sufficiently to prevent reëngagement with said escapement detents, but not enough to permit movement of the carrying lever 48.

Hence, so long as a column actuator is in a position other than its normal elevated position, and notwithstanding a release of the escapement-member by either one or the other of the releasing-detents 44, 45, the carrying-cam is prevented from making a carrying throw to lift the carrying lever 48 until the detaining latch tooth 53 is again moved out of engagement with a stop 43 of the escapement member, by the return to normal of the column actuator of the next higher order,—the order that is to receive the released carrying throw. It is thus provided that keys may be depressed simultaneously, and column actuator impulses delivered, in two or more adjacent orders and yet any carrying impulses released from a lower one of said orders will not be actually delivered to the next higher of said orders until the column actuator movement of such higher order is completed. The operation of effecting simultaneous key-driven actuation of a plurality of column-actuators in adjacent orders, the strokes overlapping each other in any manner, is the action that has been hereinbefore referred to as "duplexing."

A three armed locking-pawl normally holds each carrying lever from displacement, the upwardly extending arm 57 of said pawl being positioned to intercept any downward movement of the forwardly extended arm 58 of the coöperating carrying lever; but just before the carrying lever is to make a carrying throw, this pawl is thrown out of such intercepting position by reason of the lifting of a rearwardly extended arm 59 of the three armed pawl by a cam lug on the carrying-cam member adjacent to the cam-arm over which the dolly-roll 47 of the carrying lever is about to ride. A spring 60 acting on said three armed pawl maintains the latter in its normal locking position. The carrying lever shaft supports a spring pressed back stop 61 for preventing rearward movement of the lantern wheel 31ª during operation by key-actuation. A spring 62 connecting the carrying lever 48 with a fixed portion of the frame maintains said carrying lever in its normal position and returns the same back to its normal position after each carrying-throw. The stop detent 54 is provided at its rear end with a tooth 63 for preventing overthrow of the lantern-wheel 31ª, it being understood that when the lantern-gear is operated by key actuation the dolly-roll 50 of the column actuator is shifted from beneath the aforesaid stop detent permitting the spring 55 to throw the stop detent into the position wherein the tooth 63 is out of the path of the pins of the lantern-wheel, but on return of the column actuator to its normal position the tooth 63 is again moved into the path of a pin of said lantern-wheel. In carrying, the movement of the carrying lever 48 during the carrying-throw shifts the stop detent 54 out of the path of the pins of the lantern-wheel, as shown in Fig. 6, and the return movement of the carrying-lever restores the stop detent to its normal overthrow restraining position. The upper arm 57 of the herein-described three-arm pawl receives the thrust transmitted from the stop-detent tooth 63, through the carrying-lever 48.

Such is, in brief outline, the manner in which prime-actuations and carrying-impulses are imparted to the accumulator mechanisms in the Duplex Comptometers of the above mentioned patents. It will also be understood that these actuating mechanisms are associated with various stop-mechanisms set forth in the said patents, to limit the movements imparted to the accumulator mechanisms by the prime actuations and carrying impulses; all of these stop mechanisms are shifted variously into and out of their various stop positions to impose additional restriction to the movements of the carrying-devices and to the prime actuations of the accumulators.

The present invention further comprehends an improved zeroizing mechanism for clearing the machine or zeroizing, that is, for returning the numeral wheels and other parts to the zero positions, and broadly stated, this zeroizing operation is accomplished, as in my co-pending application above referred to, by disconnecting the connections between the numeral wheels and the actuating devices so that, while retaining the various above mentioned stop devices in their normal relations to the accumulator mechanisms, the stored power in the carrying springs may give to the numeral wheels backward rotations so as to move them rearwardly from the divers positions they may occupy and to stop them when they individually arrive at zeroizing positions. The present invention, however, contemplates a mechanism for accomplishing this result that although positive in operation, has a much lighter action than the mechanism disclosed in my co-pending application aforesaid, and may be set in motion by the little finger of the operator's hand while permitting the other fingers of the operator's hand to remain in their normal positions over the keys. Canceling or zeroizing may thus be effected in a much more rapid manner than has been heretofore accomplished, with a resultant increase in the rapidity of action of the calculating machine. Other advantages of the present zeroizing mechanism and other improvements provided by the present invention will be particularly pointed out as the description proceeds.

In the present instance, zeroizing is effected by detraining or disengaging the transmitting pinions or gears 31 from the carrying-spring winding gears 32. The shaft 37 of the numeral wheels is mounted in bearings fixed in the frame of the machine, as is likewise the shaft 30 of the lantern wheel and pinions 31 and the shaft 35 of the gears 34 that are intermediate the winding gears 32 and the numeral wheel gears 36. In order to effect detraining or disengagement of the gears 32 from the pinions 31 of the lantern wheels, the shaft 33 of the gears 32 is carried by a swinging frame that is adapted to have a slight outward pivotal movement on an axis coincident with the shaft 35. This swinging frame in general comprises partition plates 64 connected together at suitable points by transverse tie-rods 65. Each one of the plates 64 includes a main portion fixed to the tie rods 65 and provided with a laterally extended wing 66 at the end of which is an interned and upwardly extending end 67 bent in general parallelism with the main portion of the plate. This inwardly bent end 67 also embraces and is fixed upon the upper tie rod 65 and is further provided with lips or projections 68, 69 (see Fig. 7) which are bent in such fashion that they are disposed on opposite sides of the ends of the partition walls 23 of the fixed frame, with the result that the ends of these partition walls function as lateral guides for the swinging frame during its pivotal movement. As the swinging frame carries the shaft 33 of the carrying-spring winding gears 32, the latter are disconnected from the transmitting pinions or gears 31 of the lantern wheels whenever said swinging frame is imparted an outward pivotal movement about the axis 35 of the gears 34. The above mentioned detraining or disconnection of the gears 32 from the gears 31 is a function incidental to the clearing or zeroizing of the machine, and, in accordance with the present invention, the swinging frame is retained in such detraining position after a zeroizing operation has been effected and until a key 25 has been depressed to effect a further operation of the accumulator mechanism, whereupon the swinging frame is again restored to position for entraining the winding gears 32 with the gears 31. The detraining of the gears 32 from gears 31 functions to relieve the carrying springs from the influences of the various back stops, locks and other devices provided to prevent rearward movement of the winding gears and other parts, while maintaining such stops, locks and other devices in their normal operative positions. Such influences act directly upon the lantern wheels and their effect is transmitted through the gears 31 to the winding gears 32, to prevent backward rotation of said winding gears. By detraining the winding gears 32 from the aforesaid gears 31, the winding gears are removed from the zone of influence of such stops, etc., with the result that the carrying springs 41 are permitted to impart rearward or backward rotation to the winding gears 32, which movement is utilized for the purpose of returning the several numeral wheels individually to zero position. The detraining operation does not effect the operation of the stops or other restraining devices acting on the escapement member 42, to which the other end of the carrying-spring 41 is attached, as hereinbefore described, and accordingly; as the springs are restrained by the carrying escapement members themselves during zeroizing, it is not necessary to bring into play any stop in the zeroizing, except of course such stops as are required to halt the numeral wheels upon their arrival at zero positions.

As shown more particularly in Fig. 4 a short transverse shaft 70 is journaled in a bearing in the right hand side plate 22 of the fixed frame and this shaft projects through the outer casing and carries at its outer end an operating handle or lever 71, hereinafter termed the "zeroizing lever". A segment 72 is fixed upon the inner end of said short transverse shaft 70 and pivoted to said segment 72 is a link 73 which is in turn pivoted to a depending lever 74 that is pivoted at 75 on the fixed frame. The lower end of said lever arm 74 is pivotally connected by means of a short link 76 with an arm 77 rotatably mounted with respect to a transverse shaft 78 that is journaled in the fixed frame. The arm 77 is provided with an engaging face 79 adapted to contact with a second arm 80 fast on the shaft 78. The operation of this construction is as follows: When the parts are in the relative positions indicated in Fig. 4 a short swinging movement of the zeroizing lever 71 toward the left will through the segment 72, link 73, lever arm 74, short link 76, arm 77 and rocker arm 80 impart a short rocking movement to the shaft 78 in a counter clockwise direction. Fixed on the aforesaid shaft 78 and rotatable therewith are other rocker arms 81. These rocker arms 81 are pivotally connected with curved links 82 having slotted shifting pivots upon a transverse shaft 83. (See Figs. 6 and 7). The forward end of each of said curved links 82 is provided with a pin 84 positioned within the spaced jaws 85 of the inner member 86 of a toggle. The said toggle member 86 is pivoted between its end on a shaft 87 carried by the swinging frame hereinbefore described, and the outer end of each toggle member 86 is pivotally connected by a shaft 88ᵃ with the other member 88 of the toggle. The several toggle members 88 are pivoted on studs 89 mounted on the fixed frame and these toggle members 88 are respectively provided with depending arms 90 having stop projections 91 adapted to engage the toggle members 86 and to limit their movement upon rocking the shaft 78 in a counter clockwise direction as viewed in Fig. 7. When the swinging frame is in such position that the gears 32 are in mesh with the gears 31, i. e., the normal position of the parts during operation of the calculating machine, the several toggles hereinabove described occupy the position illustrated in Figs. 6 and 7. On operation of the zeroizing lever 71 to effect canceling, i. e., toward the left as viewed in Fig. 4, the link and lever connection hereinabove described imparts a counter clockwise rotation to the shaft 78, and the latter in turn through the arms 81 shifts the curved links 82. In so moving, the pins 84 of the aforesaid curved links 82 push down on the lower jaws 85 of the toggle members 86, thereby throwing the toggles past their dead centers to the position illustrated in Figs. 2 and 3. As the toggle members 86 are pivoted at 87 to the respective plates of the swinging frame, such movement of the toggles past their dead centers is accompanied by an outward swinging of the swinging frame and a resultant detraining or displacement of the winding gears 32 from the gears 31. The entire detraining movement is thus accomplished positively by the operation of the zeroizing lever 71, the toggles deriving their motion in this direction from the manual movement imparted to the zeroizing lever.

The swinging frame herein above described is so pivoted that it is held in position for entraining the gears, i. e.,—in inwardly swung position against gravity. Hence, the movement of the toggles to swing the frame outwardly and effect detraining is assisted by gravity which tends to swing the frame outwardly, with the result the action of the zeroizing lever 71 is lightened.

Detraining the carrying gears 32 from the gears 31 leaves the carrying springs 41 free to unwind and such unwinding occurs until the numeral wheels arrive at zero. The unwinding action of the springs is terminated by stops which are projected into operative position by the toggles. These stops are embodied in arms 92 pivoted on the shaft 87 of the toggle members 86 and provided at their lower ends with lugs 93 adapted to be engaged by lugs 94 carried by the toggle members 86. Springs 95 hold the lugs 93 in engagement with the lugs 94. With this construction, when the toggle members 86 are swung in the manner hereinbefore set forth, the stop arms 92 are swung rearwardly from the inclined position shown in Fig. 7 to a position wherein the lips 96 formed in the upper ends of said stop arms 92 lie in the path of either one or the other of two fixed stops 97 appropriately located on the face of each winding gear 32. As soon as one of the stops 97 come into engagement with the lips 96 of the stop arms 92 the unwinding action of the carrying springs 41 is terminated and the numeral wheels are held in zero position. The connection constituted of the arms 81, links 82, the toggle parts 88, 90, and the jaw ends of the toggle parts 86, are omitted, for instance, in alternate orders, as the shaft 88ª will, through the forward portions of the parts 86, operate the alternate stop arms 92, by reason of the fact that the shaft 88ª is shifted with the toggle parts above described.

Figure 5:
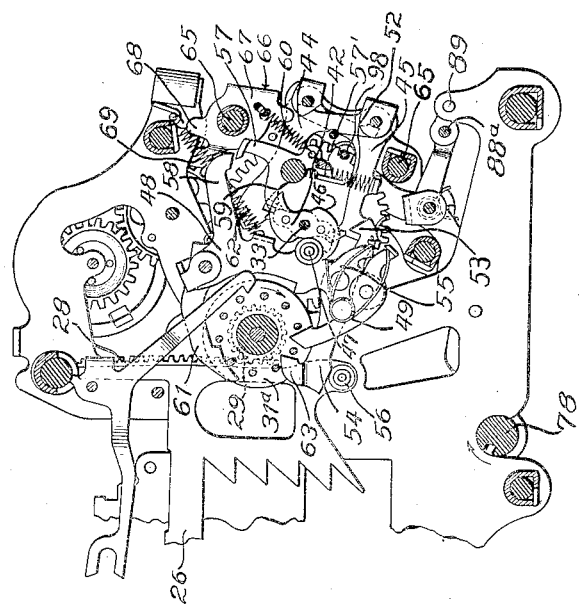
Fig. 5 is a detail sectional elevation of parts of the accumulator mechanisms, carrying mechanisms, and zeroizing mechanism that are located in the front portion of the machine.

Projecting from the faces of the respective stops 92 are pins 98, see Figs. 5 and 7. These pins 98, on movement of the stop arms 92 into operative position are adapted to engage the lower arms 57' of the three-armed dogs 57 the upper arms of which coöperate with the arms 58 of the carrying levers 48, see Fig. 5, and such engagement of the pins 98 with said arms 57' is effective to move the three-armed dogs so that their upper arms 57 are shifted out of operative position with respect to the aforesaid arms 58 of the carrying levers 48. As the dogs are pivoted on the swinging frame and the carrying levers 48 are pivoted on the fixed frame, this movement of the arms 57 of the dogs away from the arms 58 of the carrying levers prevents the arms 58 from holding the swinging frame against free swinging movement to effect detraining as aforesaid. Springs 60 connecting the dogs with the inturned projection 67 of the swinging frame restores such dogs to their normal position when the stop arms 92 have been shifted to their normal position out of the path of the stops 97.

As above stated, the swinging frame is pivoted on the shaft 35 of the intermediate gears 34, which shaft 35 is located almost directly above the shaft 33 of the winding gears 32. The swinging frame is thus pivoted adjacent to its center of balance, with the result that an exceedingly well balanced and efficient construction is provided. Furthermore, by this arrangement the numeral wheels may be located at a higher point in the frame and more directly in the line of vision of the operator. The pivoting of the swinging frame on the intermediate gear shaft 35 and the displacement of the axis of the winding gears 32 with relation to the axis of the intermediate gears 34 in zeroizing movement of the swinging frame, imparts a slight rotary movement to the gears 34 in addition to that imparted to them by the zeroizing movement proper, and this additional rotation is imparted to the numeral wheel pinions 36. The gears 32, 34, 36 being of relatively smaller diameters in the order named and having a relatively smaller number of teeth, this winging movement of the frame pivoted on the shaft 35 of the intermediate gears is effective to produce an appreciable displacement of the characters on the numeral wheels with respect to the sight openings in the casing, so that on arrival of the several numeral wheels at zero, after a zeroizing operation, this displacement of the zeros in the several sight openings indicates to the operator that a zeroizing operation has just been effected and the machine has been cleared for a new calculating operation, making it unnecessary for the operator to examine each opening to ascertain whether or not the machine is in a cleared condition.

In accordance with the present invention the swinging frame is retained in its outward position, after a zeroizing operation has been effected and the gears 32 are maintained in disengagement with respect to the gears 31 until the operation of one of the keys 25. As a result of this arrangement, the return movement of the zeroizing lever 71 is idle, in so far as the swinging frame and the toggles are concerned, and may be accomplished by an exceedingly light spring action, permitting the operator to release his finger from the zeroizing lever as soon as the latter has completed the forward canceling stroke. Pivoted on a pin 100 projecting from the zeroizing lever 71 (as shown in Fig. 4) is the forward end of a link 101, and the rear end of the latter is pivoted to the lower end of a depending rocker arm 102 that is pivoted on a shaft 103 having a bearing in the fixed frame. Connecting the rocker arm 102 with the fixed frame is a spring 104, which acts on release of the zeroizing lever 71 at the completion of a forward canceling stroke to draw said rocker arm 102 and link 101 rearwardly and thus restore the zeroizing lever 71, link 73, lever arm 74, short link 76 and arm 77 to their normal positions. On the return movement of the zeroizing lever 71 the arm 77 moves independently of the arm 79 that is fixed to the shaft 78, the arm 80 being held against backward movement by the outwardly positioned swinging frame.

According to the present invention, the swinging frame is restored to position for entraining the winding gears 32 with the gears 31 upon the next actuation of a key 25 after a zeroizing operation has been effected. This is accomplished by means of the following instrumentalities: Fixed on the shaft 78 is an upstanding arm 105 (see Figs. 3, 8, 9 and 10) and pivoted on the upper end of said arm 105 is a short link 106 to which is attached a spring 107 that extends to and is connected with the fixed frame at 108, as shown in Fig. 3. A toggle member 109 has a slotted pivot at one end on the arm 105, and the other end of said toggle member is pivotally connected with the second member 110 of the toggle. The latter toggle member 110 is in turn pivoted on a transverse shaft 111 supported by the fixed frame of the machine, and is provided with a portion 112 bent from the plane of the toggle member 110 and terminating in a rebent portion 113 that is also pivoted on the aforesaid shaft 111. A spring 114 connects the portion 112 of the toggle member 110 with the fixed frame as shown in Fig. 3. When the above described toggle members and associated parts are in the extreme position illustrated in Fig. 8 the spring 114 is under tension and the spring 107 is compressed. The parts occupy the position illustrated in Fig. 8 when the hereinabove described swinging frame is in its normal position, i. e., with the gears 31 and 32 in mesh. On movement of the shaft 78 by the zeroizing lever 71, the arm 105 draws the opposite members 109 and 110 of the toggle into the position shown in Figs. 9 and 10, the intermediate pivot point of the toggle being shifted past dead center. This positive movement of the toggle parts is assisted to some extent by the power stored up in the spring 114. Concurrently, however, with such movement the spring 107 is placed under tension and is so held by the movement of the intermediate pivot of the toggle parts past dead center. Formed on the toggle member 110 is an upstanding arm 115 adapted to be projected, on movement of the toggle parts into the gear-detrained position shown in Figs. 9 and 10, into the path of a pin 116 carried by the upper end of an arm 117 that is fast on the transverse shaft 111. Pivoted to the upper end of the arm 117 is a link 118 which extends rearwardly of the machine and has its rear end pivoted on a transverse shifting bar 119 that is supported by vertical arms 120 upstanding from and connected to a transverse rock bar 121 journaled in bearings on the opposite sides of the fixed frames 22 of the machine.

Pivoted on a transverse shaft 122 supported by the fixed frame are the usual resistance levers 123 respectively corresponding with the several columns or orders of the machine and having their lower ends extended beneath the path of movement of the aforesaid shifting bar 119, as shown in Fig. 2. The upper ends of these levers 123 are attached to springs 124 extending to a fixed part of the frame and adapted normally to draw the upper ends of said levers 123 rearwardly and thus to maintain their lower ends out of engagement with the shifting bar 119. Each lever 123 is provided adjacent its lower end with a forwardly and downwardly inclined cam edge 125 adapted to be engaged by a dolly roll 126 supported by the corresponding column actuator 26.

On movement of the toggle parts 109, 110 to the position illustrated in Figs. 9 and 10, by the operation of the zeroizing lever, the engagement of the arm 115 with the pin 116 of the arm 117 imparts a slight forward movement to the latter arm 117, and in so doing shifts the link 118 forwardly, such forward movement of link 118 drawing the shifting bar 119 forwardly into a position that is just in the rear of the depending portions of the several levers 123. Such are the positions the several parts above described occupy upon the completion of a zeroizing movement of the zeroizing lever 71; all of the parts remain in these positions until the actuation of a key 25 and the consequent depression of its companion column actuator 26. The depression of a column actuator 26 causes its dolly roll 126 to ride down the inclined cam edge of the coöperating lever 123 and in so doing effects a rearward movement of the lower end of said lever 123. This rearward movement of the lever 123 engages said lever with the shifting bar 119 just behind and in so doing shifts the bar 119 rearwardly to impart a like rearward movement to the link 118. Rearward shifting of the link 118 causes the arm 117 on the shaft 111 to move rearwardly and the consequent rearward movement of the pin 116 imparts a rearward movement to the upstanding arm 115 of the toggle member 110, and in so doing the intermediate pivot of the two toggle members 109 and 110 is shifted rearwardly past dead center. As soon as the intermediate pivot of the two toggle members 109 and 110 moves past dead center the spring 107, which is under tension, is released and the power stored up in said spring completes the movement of the toggle parts back into the normal position illustrated in Fig. 8, and through the consequent rearward rocking movement imparted to the shaft 108 by the arm 105 restores the aforesaid toggle parts 86, 90 to their normal position and, swinging the aforesaid swinging frame inwardly again entrains the gears 31 and 32. The above described movement of the shaft 78 is likewise effective to restore the arm 80 into position for being engaged by the arm 77, upon the next zeroizing movement of the zeroizing lever 71. Simultaneously with the return movement of the spring 107 the spring 114, which is considerably lighter than the spring 107, is placed under tension.

By reason of the fact that the first key 25 operated after a zeroizing operation has been completed is connected to the parts which release the spring for returning the frame to gear entraining position, the initial resistance to depression of this first key operated is materially increased over the resistance present in normal key-actuation. The materially harder touch of a key operated to restore the swinging frame to gear entraining position is a signal to the operator that a calculating operation has started on a cleared machine.

On the return of a column actuator 27 to its normal elevated position the spring 124 restores the lever arm 123 to its normal position. Formed on the toggle member 110 is a stop 127 adapted to engage the pin 116 to push back the bar 119, beyond the zone of operation of the aforesaid resistance levers, with the result that no additional resistance is imposed on the keys during normal key-actuation. A stop 128 is likewise formed on the toggle member 109 and is adapted to be shifted into engagement with a stop bar 129 carried by the fixed frame to limit the movement of the toggle parts 109 and 110 on shifting of the swinging frame into geared detraining position.

In the above described construction for restoring the several numeral wheels of the machine to zero, the forward stroke of the zeroizing lever shifts the swinging frame to effect detraining of the winding gears from the gears 31 and movement of the carrying springs beyond the influence of the stops and latches. The rearward stroke of the zeroizing lever is idle so far as any movement of the swinging frame is concerned and is entirely spring or power returned. In effecting a zeroizing operation, the operator is thus concerned only with imparting a forward stroke to the zeroizing lever and may remove his finger from the lever upon the completion of such forward stroke and resume calculating manipulation of the keys 25. No great amount of power is required to restore the swinging frame to gear entraining position, upon the operation of the first key after the zeroizing movement of the zeroizing lever has been effected, for the reason that the swinging frame is directly restored to gear entraining position by spring action and the only additional work required by the key depression is to shift the pivot point of the toggle members 109, 110 past dead center to release the spring and permit it to effect the return movement of the swinging frame. The zeroizing lever is mounted near the top of the machine, within convenient reach of the operator and the train of parts connected with it are so light in action and the stroke of the lever is so short that an operator can readily actuate the zeroizing lever by his little finger.

In addition to the improvements above described the invention provides a means for sounding an audible signal upon the next depression of a key after a zeroizing operation has been effected, so as to apprise the operator of the fact that another calculating operation has commenced, and that the operator has started another calculating operation with the several numeral wheels of the accumulator mechanisms all in zero position. Mounted in the fixed frame of the machine is a bell 130; a clapper 131 is journaled on the shifting bar 119 and is provided with a depending arm 132 adapted to engage the forward edge of the rock bar 121. Encircling a sleeve 133 mounted on the shifting bar 119, as shown in Fig. 13, is a coil spring 134 having one end 135 in engagement with a projection 136 formed on the clapper 131 and having its other end 137 in engagement with the rock bar 121. On rearward movement of the link 118 upon release of the spring 107 by the first key actuated after a zeroizing operation the impetus imparted to the clapper 131 is sufficient to cause the head of said clapper to engage the bell 130 and ring it. After ringing of the bell the spring 134 returns the clapper to the normal position shown in Fig. 11 wherein the depending arm 132 is in engagement with the rock bar 121.

The invention further provides means for locking the several keys 25 against actuation during the effective forward stroke of the zeroizing lever 71 to release the winding gears 32 from the transmitting pinions 31. Referring to Figs. 2, 3 and 4, there is shown a transverse shaft 142 supported by the fixed frame of the machine and corresponding to the similarly numbered shaft in the patent to Dorr E. Felt No. 1,072,933 dated September 9, 1913. The shaft 142 is provided with the usual rearwardly extending arms 144, but in the present instance the forwardly extending arms 145 disclosed in said patent are omitted. The motion of these forwardly extending arms 145 results in a movement of the usual reverse locking pawls, the operation of which is fully described in said patent, out of engagement with the teeth of the usual ratchet on rocking of the shaft 142 in a clockwise direction, as the rearwardly extending arms 144 are depressed on such rocking of the shaft to lift the usual detents out of engagement with the pins of the lantern wheels. The omission of the forwardly extending arms 145, in accordance with the present invention, permits the reverse locking pawls to engage the ratchets of the accumulator mechanisms whenever the shaft 142 is so rocked thereby locking the accumulator mechanisms against operation. The zeroizing lever 71 controls the movement of the shaft 142 by means of the following connections. Referring to Fig. 4 the shaft 142 is provided with a crank 146 adapted to be engaged by a shoulder 147 formed near the upper end of the depending lever arm 74 of the connections for transferring the forward effective throw of the zeroizing lever to move outwardly the swinging frame in the manner hereinbefore described. With this construction, the forward movement of the zeroizing lever results in an engagement of the reverse locking pawls with the teeth of the ratchets of the accumulator mechanism thereby holding said ratchets against rotation and preventing depression of any of the keys 25 during such movement of said lever. On rearward movement of the zeroizing lever the reverse locking pawls are released and the usual detents are permitted to reëngage the pins of the lantern wheel.

The calculating machine described in the above specification embodies various other instrumentalities and devices which need not herein be described for the reason that they are fully set forth in the prior patents above mentioned and in my said co-pending application.

The invention as hereinabove set forth is embodied in a particular form of construction but may be variously embodied within the scope of the claims hereinafter made.

Claims—

1. In a calculating machine, in combination: a plurality of keys; numeral wheels; actuating devices for said numeral wheels rendered operative upon movement of the keys; carrying springs tensioned with the forward movement of said wheels by said actuating devices; stops for preventing release of said carrying springs between the actuations of said numeral wheels; means for freeing said numeral wheels and said springs from the influence of said stops, while said stops remain in normal operative positions, to permit the springs released to return the numeral wheels to zero; and key-controlled means for restoring said numeral wheels and said springs under the influence of said stops; substantially as specified.

2. In a calculating machine, in combination: a plurality of keys; numeral wheels; actuating devices for said numeral wheels rendered operative upon movement of the keys; carrying springs tensioned with the forward movement of said wheels by said actuating devices; stops for preventing release of said carrying springs between the actuations of said numeral wheels; a unitary operating means for freeing said numeral wheels and said springs from the influence of said stops, while said stops remain in normal operative positions, to permit the springs released to return the numeral wheels to zero; and key-controlled means for restoring said numeral wheels and said springs under the influence of said stops; substantially as specified.

3. In a calculating machine, in combination: a plurality of keys; numeral wheels; actuating devices for said numeral wheels rendered operative upon movement of the keys; springs tensioned with the forward movement of said wheels by said actuating devices; stops for preventing release of said springs between the actuations of said numeral wheels; means for freeing said numeral wheels and said springs from the influence of said stops, while said stops remain in normal operative positions, to permit the springs released to return the numeral wheels to zero; and key-controlled means for restoring said numeral wheels and said springs under the influence of said stops; substantially as specified.

4. In a calculating machine, in combination: a plurality of keys; numeral wheels; actuating devices for said numeral wheels rendered operative upon movement of the keys; springs tensioned with the forward movement of said wheels by said actuating devices; stops for preventing release of said springs between the actuations of said numeral wheels; means for freeing said numeral wheels and said springs from the influence of said stops, while said stops remain in normal operative positions, to permit the springs released to return the numeral wheels to zero; a spring means for restoring said numeral wheels and said springs under the influence of said stops; and key-controlled means for releasing said spring means; substantially as specified.

5. In a calculating machine, in combination: a plurality of keys; numeral wheels; actuating devices for said numeral wheels rendered operative upon movement of the keys; springs tensioned with the forward movement of said wheels by said actuating devices; stops for preventing release of said springs between the actuations of said numeral wheels; means for freeing said numeral wheels and said springs from the influence of said stops, while said stops remain in normal operative positions, to permit the springs released to return the numeral wheels to zero; and spring-operated key-released means for restoring said numeral wheels and said springs under the influence of said stops; substantially as specified.

6. In a calculating machine, in combination: a plurality of keys; numeral wheels; actuating devices for said numeral wheels rendered operative upon movement of the keys; carrying springs tensioned with the forward movement of said wheels by said actuating devices; stops for preventing release of said carrying springs between the actuations of said numeral wheels; means for freeing said numeral wheels and said springs from the influence of said stops, while said stops remain in normal operative positions, to permit the springs released to return the numeral wheels to zero; and spring-operated key-released means for restoring said numeral wheels and said springs under the influence of said stops; substantially as specified.

7. In a calculating machine, in combination: a plurality of keys; numeral wheels; actuating devices for said numeral wheels rendered operative upon movement of the keys; carrying springs tensioned with the forward movement of said wheels by said actuating devices; stops for preventing release of said carrying springs between the actuations of said numeral wheels; means for freeing said numeral wheels and said springs from the influence of said stops, while said stops remain in normal operative positions, to permit the springs released to return the numeral wheels to zero; means for maintaining said numeral wheels and springs so freed from the influence of said stops; and key-controlled means for restoring said numeral wheels and said springs under the influence of said stops; substantially as specified.

8. In a calculating machine, in combination: a plurality of keys; numeral wheels; actuating devices for said numeral wheels rendered operative upon movement of the keys; carrying springs tensioned with the forward movement of said wheels by said actuating devices; stops for preventing release of said carrying springs between the actuations of said numeral wheels; means for freeing said numeral wheels and said springs from the influence of said stops, while said stops remain in normal operative positions, to permit the springs released to return the numeral wheels to zero; means for maintaining said numeral wheels and springs so freed from the influence of said stops; and spring-operated key-released means for restoring said numeral wheels and said springs under the influence of said stops; substantially as specified.

9. In a calculating machine, in combination: a plurality of keys; numeral wheels; actuating devices for said numeral wheels rendered operative upon movement of the keys; springs tensioned with the forward movement of said wheels by said actuating devices; stops for preventing release of said springs between the actuations of said numeral wheels; means for freeing said numeral wheels and said springs from the influence of said stops, while said stops remain in normal operative positions, to permit the springs released to return the numeral wheels to zero; means for maintaining said numeral wheels and springs so freed from the influence of said stops; and key-controlled means for restoring said numeral wheels and said springs under the influence of said stops; substantially as specified.

10. In a calculating machine, in combination: a plurality of keys; numeral wheels; actuating devices for said numeral wheels rendered operative upon movement of the keys; springs tensioned with the forward movement of said wheels by said actuating devices; stops for preventing release of said springs between the actuations of said numeral wheels; means for freeing said numeral wheels and said springs from the influence of said stops, while said stops remain in normal operative positions, to permit the springs released to return the numeral wheels to zero; means for maintaining said numeral wheels and springs so freed from the influence of said stops; and spring-operated key-released means for restoring said numeral wheels and said springs under the influence of said stops; substantially as specified.

11. In a calculating machine, in combination: keys; ordinal actuating devices; ordinal numeral wheels actuated by said devices; carrying springs; a driving connection between each numeral wheel and its actuating device, including, driving intermeshing gears; means for detraining said gears to permit the carrying springs to unwind and return said ordinal numeral wheels to zero; and key-controlled means for entraining said gears; substantially as specified.

12. In a calculating machine, in combination; keys; ordinal actuating devices; ordinal numeral wheels actuated by said devices; carrying springs; a driving connection between each numeral wheel and its actuating device, including, driving intermeshing gears; means for detraining said gears to permit the carrying springs to unwind and return said ordinal numeral wheels to zero; and spring-operated key-released means for entraining said gears; substantially as specified.

13. In a calculating machine, in combination: keys; ordinal actuating devices; ordinal numeral wheels actuated by said devices; carrying springs; a driving connection between each numeral wheel and its actuating device, including, driving intermeshing gears; a unitary operating means for detraining said gears to permit said carrying springs to unwind and return said ordinal numeral wheels to zero; and key-controlled means for entraining said gears; substantially as specified.

14. In a calculating machine, in combination: keys; ordinal actuating devices; ordinal numeral wheels actuated by said devices; carrying springs; a driving connection between each numeral wheel and its actuating device, including, driving intermeshing gears; means for detraining said gears to permit the carrying springs to unwind and return said ordinal numeral wheels to zero; means for maintaining said gears so detrained; and key-controlled means for entraining said gears; substantially as specified.

15. In a calculating machine, in combination: keys; ordinal actuating devices; ordinal numeral wheels actuated by said devices; carrying springs; a driving connection between each numeral wheel and its actuating device, including, driving intermeshing gears; means for detraining said gears to permit the carrying springs to unwind and return said ordinal numeral wheels to zero; means for maintaining said gears so detrained; and spring-operated key-released means for entraining said gears; substantially as specified.

16. In a calculating machine, in combination: keys; ordinal actuating devices; ordinal numeral wheels actuated by said devices; carrying springs; a driving connection between each numeral wheel and its actuating device, including, driving intermeshing gears; a swinging frame for detraining said gears to permit the carrying springs to unwind and return said ordinal numeral wheels to zero; means for so swinging said frame; and key-controlled means for restoring said frame to gear entraining position; substantially as specified.

17. In a calculating machine, in combination: keys; ordinal actuating devices; ordinal numeral wheels actuated by said devices; carrying springs; a driving connection between each numeral wheel and its actuating device, including, driving intermeshing gears; a swinging frame for detraining said gears to permit the carrying springs to unwind and return said ordinal numeral wheels to zero; means for so swinging said frame; means for maintaining said frame in gear detraining position; and key-controlled means for restoring said frame to gear entraining position; substantially as specified.

18. In a calculating machine, in combination: keys; ordinal actuating devices; ordinal numeral wheels actuated by said devices; carrying springs; a driving connection between each numeral wheel and its actuating device, including, driving intermeshing gears; a swinging frame, mounted on an axis below the numeral wheels, for detraining said gears to permit the carrying springs to unwind and return said ordinal numeral wheels to zero; means for so swinging said frame; and key-controlled means for restoring said frame to gear entraining position; substantially as specified.

19. In a calculating machine, in combination: keys; ordinal actuating devices; ordinal numeral wheels actuated by said devices; carrying springs, a driving connection between each numeral wheel and its actuating device, including, driving intermeshing gears; a swinging frame, mounted on an axis below the numeral wheels, for detraining said gears to permit the carrying springs to unwind and return said ordinal numeral wheels to zero; means for so swinging said frame; means for maintaining said frame in gear detraining position; and key-controlled means for restoring said frame to gear entraining position; substantially as specified.

20. In a calculating machine, in combination: a series of numeral wheels; a series of column actuators operating said wheels; a carrying mechanism for each wheel; a member, associated with each carrying mechanism, having a numeral wheel overthrow-prevention latch and a detaining latch adapted to delay operation of the carrying mechanism; and means responsive to actuation of a companion column actuator for rendering inoperative said overthrow-prevention latch and for concurrently rendering operative said detaining latch; substantially as specified.

21. In a calculating machine, in combination: a series of numeral wheels; a series of column actuators operating said wheels; a carrying mechanism for each wheel; and a column-actuator-controlled member associated with each carrying mechanism and having a numeral wheel overthrow-prevention latch and an alternately operable detaining latch adapted to delay operation of the carrying mechanism; substantially as specified.

22. In a calculating machine, in combination: keys; numeral wheels, actuating devices rendered operable upon movement of said keys; connections between said actuating devices and said numeral wheels; a lever-operated key-released zeroizing mechanism for said numeral wheels; and a signal operable on release of said zeroizing mechanism; substantially as specified.

23. In a calculating machine, in combination: a plurality of keys; numeral wheels; actuating devices for said numeral wheels rendered operative upon movement of the keys; carrying springs tensioned with the forward movement of said wheels by said actuating devices; stops for preventing release of said carrying springs between the actuations of said numeral wheels; means for freeing said numeral wheels and said springs from the influence of said stops, while said stops remain in their normal operative positions, to permit the spring released to return the numeral wheels to zero;

signaling mechanism; and key-controlled means for restoring said numeral wheels and said springs under the influence of said stops, and for simultaneously actuating said signaling mechanism; substantially as specified.

24. In a calculating machine, in combination: keys; numeral wheels; actuating devices rendered operable upon movement of said keys; connections between said actuating devices and said numeral wheels; zeroizing mechanism for said numeral wheels; and a signaling means operable upon actuation of a key subsequent to a zeroizing operation; substantially as specified.

25. In a calculating machine, in combination: keys; numeral wheels; actuating devices rendered operable upon movement of said keys; connections between said actuating devices and said numeral wheels, zeroizing mechanism for said numeral wheels; and an audible signal operable upon actuation of a key subsequent to a zeroizing operation; substantially as specified.

26. In a calculating machine, in combination: keys; numeral wheels; actuating devices rendered operable upon movement of said keys; connections between said actuating devices and said numeral wheels; zeroizing mechanism for said numeral wheels; a bell; and means, operable upon actuation of a key subsequent to a zeroizing operation, for striking said bell; substantially as specified.

27. In a calculating machine, in combination: numeral wheels; keys controlling the operation of said numeral wheels; zeroizing mechanism; an actuating lever therefor having a forward and a return stroke; means for establishing a positive power connection between said zeroizing mechanism and said actuating lever on the forward stroke of the latter and adapted to release the zeroizing mechanism from the actuating lever at the end of the forward stroke of the latter; spring means for effecting the return stroke of said actuating lever; and key-controlled means for restoring the initial connections between the zeroizing mechanism and said actuating lever; substantially as specified.

28. In a calculating machine, in combination: ordinal actuating devices; ordinal numeral wheels actuated by said devices; carrying springs; a driving connection between each numeral wheel and its actuating device, including, driving intermeshing gears; a swinging frame, mounted adjacent to its center of balance, for detraining said gears to permit the carrying springs to unwind and return said ordinal numeral wheels to zero; a zeroizing lever; means for establishing a positive frame-swinging connection between said frame and said lever, on movement of the lever in one direction; spring means for effecting a return movement of said lever independently of said frame; and key-controlled means for effecting a return movement of said frame; substantially as specified.

29. In a calculating machine, in combination: ordinal actuating devices; ordinal numeral wheels actuated by said devices; carrying springs; a driving connection between each numeral wheel and its actuating device, including, driving intermeshing gears; a swinging frame, mounted adjacent to its center of balance, for detraining said gears to permit the carrying springs to unwind and return said ordinal numeral wheels to zero; means for so swinging said frame; means for maintaining said frame in gear detraining position; and key-controlled means for restoring said frame to gear entraining position; substantially as specified.

30. In a calculating machine, in combination: numeral wheels; keys controlling the operation of said numeral wheels; zeroizing mechanism; an actuating lever therefor having a forward and a return stroke; means for establishing a positive power connection between said zeroizing mechanism and said actuating lever during the forward stroke of the latter and adapted to release the zeroizing mechanism from the actuating lever at the end of the forward stroke of the latter; means for effecting the return stroke of the actuating lever independently of the zeroizing mechanism; and key-controlled means for restoring the initial connections between the zeroizing mechanism and said actuating lever; substantially as specified.

31. In a calculating machine in combination: denominational keys; numeral keys; actuating devices rendered operable upon movement of said keys; connections between said actuating devices and said numeral wheels; zeroizing mechanism for said numeral wheels; a self-returnable unitary manually-controlled means for effecting operation of said zeroizing mechanism; means for disconnecting and releasing said manually-controlled operating means from the zeroizing mechanism upon conclusion of the operation of the latter, while maintaining the relation of the zeroizing mechanism with respect to the numeral wheels; a denominational key-operated release for permitting reconnection of said zeroizing mechanism with said manually-controlled operating means; and means for effecting such reconnection; substantially as specified.

32. In a calculating machine, in combination: keys; ordinal actuating devices; ordinal numeral wheels actuated by said devices; carrying springs; a driving connection between each numeral wheel and its actuating devices, including, driving intermeshing gears; a lever-operated device for effecting a positive relative detraining movement of said gears to permit the carrying springs to unwind and return said ordinal numeral wheels to zero; a toggle lock for maintaining said gears so detrained, said toggle lock rendered effective on detraining movement of the gears; and key-controlled means for releasing said toggle lock; substantially as specified.

33. In a calculating machine, in combination: keys; ordinal actuating devices; ordinal numeral wheels actuated by said devices; carrying springs; a driving connection between each numeral wheel and its actuating devices, including, driving intermeshing gears; a lever-operated device for effecting a positive relative detraining movement of said gears to permit the carrying springs to unwind and return said ordinal numeral wheels to zero; a toggle lock for maintaining said gears so detrained, said toggle lock rendered effective on detraining movement of the gears; and spring means for reëntraining said gears; substantially as specified.

34. In a calculating machine, in combination: a plurality of keys; numeral wheels; actuating devices for said numeral wheels rendered operative upon movement of the keys; carrying springs tensioned with the forward movement of said wheels by said actuating devices; stops for preventing release of said carrying springs between the actuations of said numeral wheels; means for freeing said numeral wheels and said springs from the influence of said stops, while said stops remain in their normal operative positions, to permit the spring released to return the numeral wheels to zero; signaling mechanism; and key-controlled means, operable with an initial resistance greater than that encountered in normal key-actuation, for restoring said numeral wheels and said springs under the influence of said stops, and for simultaneously actuating said signaling mechanism; substantially as specified.

35. In a calculating machine, in combination: keys; ordinal actuating devices; ordinal numeral wheels actuated by said devices; carrying springs; a driving connection between each numeral wheel and its actuating device, including, driving intermeshing gears; a unitary operating means for detraining said gears to permit said carrying springs to unwind and return said ordinal numeral wheels to zero; and key-controlled means, operable with an initial resistance greater than encountered in normal key-actuation, for entraining said gears; substantially as specified.

36. In a calculating machine, in combination: keys; column actuators; numeral wheels; a spring operating in conjunction with each of said numeral wheels and adapted, when released, to turn said numeral wheel backwardly; accumulator mechanisms including pawl and ratchet connections for transmitting calculating movement from the column actuators to the numeral wheels; means for releasing said springs to permit them to return the numeral wheels from various positions to zero positions; means for preventing movement of said releasing means out of its spring-releasing position until the numeral wheels have been returned to zero; and key-controlled means for restoring said releasing means to normal position; substantially as specified.

37. In a calculating machine, in combination: numeral keys; column actuators; numeral wheels; carrying springs coöperatively combined with said numeral wheels; accumulator mechanisms including pawl and ratchet connections for transmitting calculating movement from the column actuators to the numeral wheels; means for releasing said carrying springs to permit said springs to return said numeral wheels from various positions to zero positions; and key-controlled means for restoring said releasing means to normal position; substantially as specified.

38. In a calculating machine, in combination: keys; column actuators; numeral wheels; a spring operating in conjunction with each of said numeral wheels and adapted, when released, to turn said numeral wheel backwardly; accumulator mechanisms including pawl and ratchet connections for transmitting calculating movement from the column actuators to the numeral wheels; a canceling crank; means operable, on movement of said canceling crank, for releasing said springs to permit them to return the numeral wheels from various positions to zero positions; and means, operating independently of the rate of movement of the crank, for preventing movement of said releasing means out of its spring-releasing position, until the numeral wheels have returned to zero; substantially as specified.

JOSEPH A. V. TURCK.